No. 662,113. Patented Nov. 20, 1900.
A. B. CLARK.
FURNITURE CASTER.
(Application filed Feb. 8, 1900.)
(No Model.)
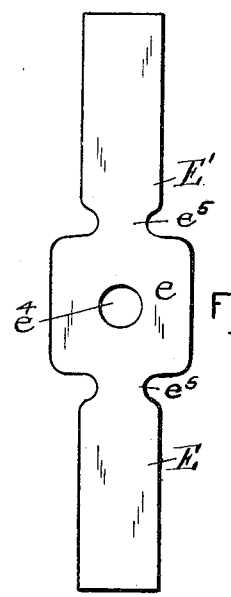
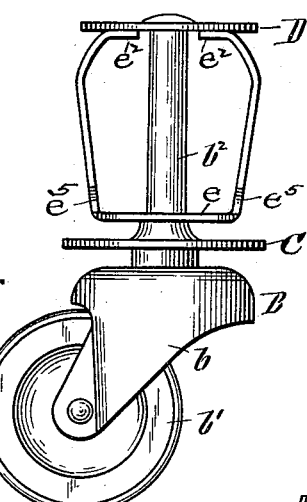
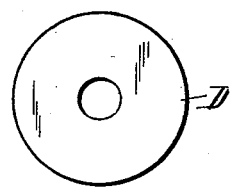
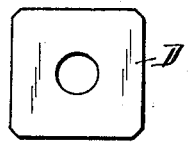
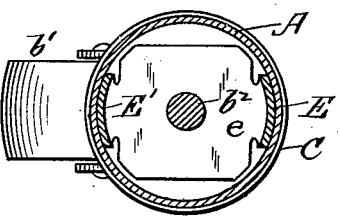
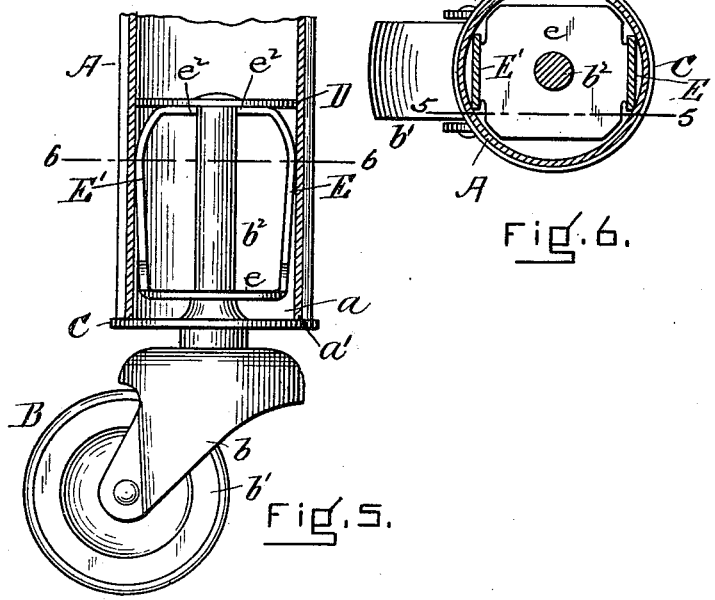
WITNESSES
M. E. Flaherty
J. M. Dolan
INVENTOR
A. B. Clark
by his attys
Clarke & Raymond

UNITED STATES PATENT OFFICE.

AMBROSE B. CLARK, OF MERIDEN, CONNECTICUT, ASSIGNOR TO THE FOSTER, MERRIAM & COMPANY, OF SAME PLACE.

FURNITURE-CASTER.

SPECIFICATION forming part of Letters Patent No. 662,113, dated November 20, 1900.

Application filed February 8, 1900. Serial No. 4,468. (No model.)

*To all whom it may concern:*

Be it known that I, AMBROSE B. CLARK, a citizen of the United States, residing at Meriden, in the county of New Haven and State of Connecticut, have invented a new and useful Improvement in Furniture-Casters, of which the following is a full, clear, and exact description, reference being had to the accompanying drawings, forming a part of this specification, in explaining its nature.

The invention relates especially to a caster having a socket or means whereby it is made attachable to and detachable from the hollow legs of metal bedsteads or hollow legs of a similar character. It is adapted to be applied to the spindle of any ordinary type of caster.

I will now describe the invention in connection with the drawings forming a part of this specification, wherein—

Figure 1 is a view in elevation of a caster having the features of my invention. Fig. 2 is a view in plan of an unformed blank which is used for a yielding retainer or attaching device. Fig. 3 is a view in plan of one form of steadying-plate. Fig. 4 is a view in plan of another form thereof. Fig. 5 represents the caster combined with the hollow metal leg of a bedstead and a portion of it upon the dotted line 5 5 of Fig. 6. Fig. 6 is a view in horizontal section upon the dotted line 6 6 of Fig. 5 and in plan of parts below said line. Fig. 7 is a view in horizontal section upon the line of Fig. 6, representing the yielding attaching or retaining arms as curved.

In the drawings, A represents a hollow metal leg of a bedstead or other article. It has the cavity $a$, which is open at the lower end of the leg.

B is the caster. It has the horn $b$, the caster-roll $b'$, and the spindle $b^2$. These may be of any desired types or forms. To the spindle there is secured near its base in any convenient way a plate C, preferably circular and of a size to close the opening to the cavity or chamber of the leg and to bear against the lower edge $a'$ of the leg. To the upper end of the spindle there is secured a plate D, which may be of any desired shape, and I have represented it as both circular and very nearly square, (see Figs. 3 and 4,) and which plate is secured to the spindle in any desired manner and is of a size to more or less snugly fit the inner wall of the leg within the cavity $a$. The two plates C and D serve to hold the caster to the hollow leg in suitable and proper relation thereto and so that it may not tip, but may be steadied with respect to it and may properly support it. Between the plates C and D are the yielding arms E E', which bear against the inner surface of the hollow leg. I have represented the arms as extending longitudinally from a base-connecting piece $e$, which is represented as fastened to the spindle $b^2$ near its lower end. The said arms preferably extend longitudinally from this base to or toward the plate D and have their free ends $e'$ bent inward beneath the said plate D, and preferably to an extent to cause their ends $e^2$ to be brought into contact with the caster-spindle when attached to the hollow leg. This type of yielding arm I prefer to make from a blank shaped as represented in Fig. 2 and which has a central part which forms the base $e$ and integral portions which form the arms E E', which arms are bent into the position shown in Fig. 1, their free ends being turned in to support the plate D. In the base-section there is a hole $e^4$, through which the caster-spindle extends. The blank is reduced to the shape represented in Fig. 1, which shows the arms in their unrestrained condition or not attached to the leg and as being somewhat farther apart than the diameter of the cavity of the leg, so that upon the introduction of the caster-socket into the cavity of the leg the arms are caused by the leg to be closed toward each other, and their ends $e^2$ are brought into contact with the caster-spindle (see Fig. 5) and to bear with any desired friction by their corner or side surfaces against the inner surface of the legs, the arms then becoming bow-springs, each end of each of which springs is confined or held, the yielding property of the spring residing in the outward bow between the ends. While I have shown the yielding arms as attached to a caster-spindle, the same result would be reached if the base $e$ bore against the inner surface of the plate C. The yielding arms also serve to hold the plate D in position or from dropping on the spindle. It will be understood that the spindle is free to turn in the plate C, base $e$, and inner plate D and that the end of the spindle is headed over the plate D.

I have described a structure which has two yielding arms; but a smaller or greater number may be employed, if desired. I prefer that the inner ends of the arms be curved to bend inward to form self-entering ends, so that when detached from the leg they may still be within the outer edge of the plate D and readily find the hole at the bottom of the leg and enter it without manipulation. I prefer that the arm or arms of the spring-holding device be relatively broad where they are in contact with the surface of the caster-leg and that they have a reduced section $e^5$ at a point adjacent to the base $e$ in order that relatively stiff material may be used and yet a sufficiently yielding and easy action be obtained. The arms may be flat, as shown in Figs. 1, 2, 3, and 6, or they may be curved to the curve of the wall of the leg, as shown in Fig. 7.

I would say that it is not essential that the arms $e^2$ of the structure represented in Figs. 1 and 5 be of such length as to be shut against the spindle when in the cavity of the leg.

Having thus fully described my invention, I claim and desire to secure by Letters Patent of the United States—

A furniture-caster having a spindle carrying a base-plate C and a plate D in combination with a U-shaped spring, the central portion of which is also carried on said spindle and the ends of which support said plate D, the intermediate portions of said spring serving to engage with the interior of a furniture-leg, as set forth.

AMBROSE B. CLARK.

Witnesses:
CHARLES N. FOSTER,
GEO. C. MERRIAM.